United States Patent Office

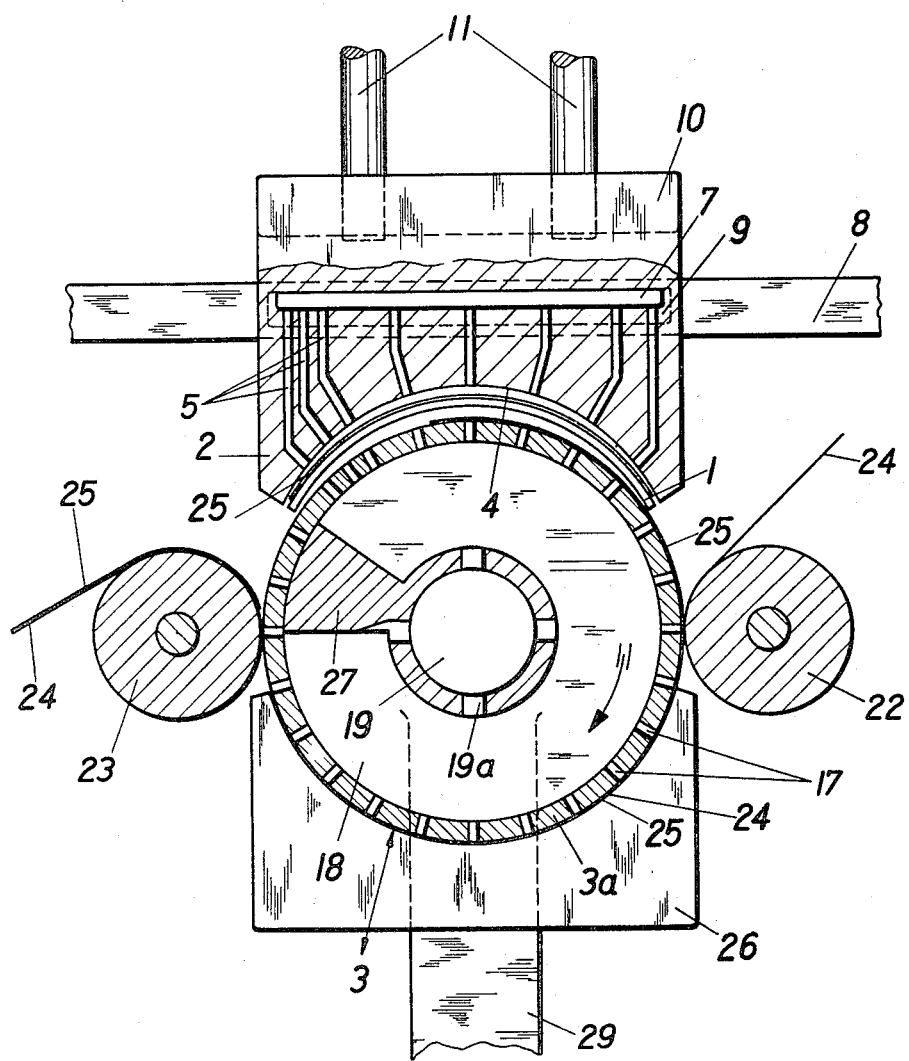

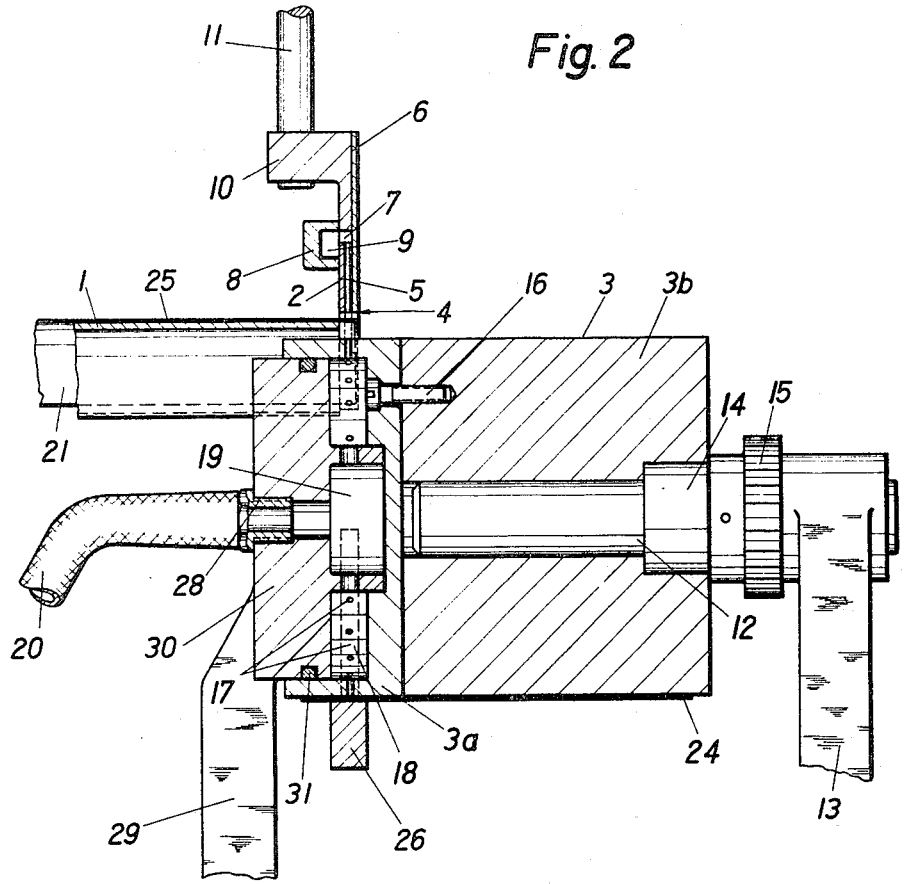

3,395,064
Patented July 30, 1968

3,395,064
DEVICES FOR ATTACHING TEAR STRIPS
TO WRAPPING MATERIAL
Alfred Schmermund, 62 Kornestrasse,
Gevelsberg, Westphalia, Germany
Filed Sept. 28, 1965, Ser. No. 490,965
Claims priority, application Germany, Oct. 12, 1964,
Sch 35,941
4 Claims. (Cl. 156—519)

ABSTRACT OF THE DISCLOSURE

For attaching tear strips to wrapping material, a device is described having a movable arcuate cutter and a counter cutter. A tear strip web is fed across the counter cutter towards the movable cutter and a tear strip is cut off from the web and positioned by the movable cutter on a rotating roller, the curvature of the movable cutter corresponding to that of the roller. During positioning of the tear strip the same is held by suction on the movable cutter and is subsequently held by vacuum on the roller to rotate therewith. Wrapping material is fed on to the tear strip held by the roller, is heat welded to the tear strip, and is subsequently removed from the roller.

---

The invention relates to devices for attaching tear strips to wrapping material.

The present invention consists in such a device comprising a movable cutter arranged to cooperate with a stationary cutter for cutting a tear strip from a web of material, a rotatable roller being provided and arranged to receive a cut-off tear strip on its periphery, means being provided for holding the tear strip on the periphery of the roller while rotating, and further means being provided for feeding wrapping material to the periphery of the roller thereby to place the tear strip against the wrapping material.

To make the invention clearly understood, reference will now be made to the accompanying drawings which are given by way of example and in which:

FIG. 1 illustrates a front view, partly in section, of a device of the invention; and FIG. 2 illustrates a side view partly in section of the device of FIG. 1.

The device illustrated comprises a movable cutter 2 arranged to co-operate with a stationary counter-cutter 1 and a roller 3 for uniting a tear strip with a length of wrapping material. The stationary counter-cutter 1 is in the shape of a segment of a cylindrical tube and the movable cutter has an arcuate cutting edge 4 which forms part of a circle. The roller 3, the stationary cutter 1 and the cutting edge 4 of the movable cutter 2 have equal radii of curvature. In the movable cutter 2, air ducts 5 are provided, for example, by milling which extend, at least in part, in the radial direction and which, at one end, open adjacent the cutting edge 4 and at the other end into a control duct 7, the ducts 5 and the control duct 7 being closed laterally by a cover 6. The control duct 7 is open at the side opposite the cover 6 and communicates with a groove forming a suction chamber 9 in a stationary control member 8. The suction chamber 9 is exhaustable in any suitable manner. The movable cutter 2 is movable by arms 11 reciprocatable in any suitable known manner, the arms 11 being connected to an extension 10 on the cutter 2.

The roller 3 comprises two roller parts 3a and 3b rigidly connected together at adjacent ends by screws 16 of which only one is visible in the drawings. The roller part 3b is rotatably mounted on a shaft 12 held in a bearing block 13. The roller 3 is rotatable by means of a sleeve 14 keyed to a gear wheel 15 operable by any known and suitable drive, the sleeve 14 entering the roller part 3b at its free end and being rigidly connected to the roller part 3b. The roller part 3a is provided with suction holes 17 which are distributed around the periphery of the roller part 3a so that they lie underneath the air duct 5 of the movable cutter 2 and are successively aligned with the air duct 5 when the roller 3 rotates. The suction holes 17 communicate with an annular suction space 18 within the roller part 3a. The annular space 18 communicates through passages 19a in a stationary hollow member 19 with an exhaust pipe 20 connected to the stationary member 19 by connection 28 in a stationary disc 30 which is adjacent to and inserted into the roller part 3a at its free end and is held by a member 29 of the machine frame. A packing 31 is provided between the disc 30 and the roller part 3a for providing an air-tight connection therebetween. Guide rollers 22 and 23 are provided for the wrapping material 24. A heating member 26 is arranged adjacent a portion of the circumference of the roller part 3a. The hollow member 19 is provided with an extension 27 bearing against a portion of the inner wall of the roller part 3a.

The device described operates as follows.

The suction chamber 9 and the space 18 are both exhausted. The roller 3 is rotated in the direction of the arrow of FIG. 1 by the gear wheel 15, and the movable cutter 2 is reciprocated by the arm 11, preferably in dependence on the speed of operation of a wrapping machine in connection with which the device is being used. A tear strip web 25 is supported by an outer wall of the counter cutter 1 and is fed in steps in any known manner to the movable cutter 2. The width of the web 25 corresponds to the length of a tear strip which is cut off from the web 25 by the movable cutter 2 during its downward stroke. When being cut the tear strip bears with its entire length against the arcuate face of the movable cutter 2 adjacent the cutting edge 4. The movable cutter 2 descends and places the tear strip against the outer periphery of the roller part 3a, the tear strip being held by the movable cutter 2 while it descends by suction from the suction chamber 9 through the control duct 7 and the air ducts 5 in the movable cutter 2. When the tear strip reaches the periphery of the roller part 3a, the suction effect is interrupted owing to the fact that the control duct 7 is disconnected from the suction chamber 9 in the stationary control member 8, has moved past the control member 8 and now communicates with the surrounding air. The tear strip positioned on the roller part 3a is held thereon by a suction effect of the holes 17 in the roller part 3a and is carried around by the roller part 3a in the direction of the arrow in FIG. 1.

By means of the guide rollers 22 and 23 a web of wrapping material 24 is guided around the lower portion of the roller 3. The tear strip cut-off from the tear strip 25 is rolled onto the web of wrapping material 24 and is heat welded thereto by means of the heating member 26.

The suction effect at the movable cutter 2 is automatically controlled by the movement of the movable cutter 2 and the stationary control member 8. The suction effect at the suction holes 17 of the roller part 3a need not be controlled at all. However, in the embodiment illustrated, the extension 27 separates holes 17 from the annular suction space and thereby renders them ineffective at that region where no suction is required, that is to say at the region between the guide roller 23 and the cutters 1 and 2. The wrapping material 24 together with the tear strip 25 welded thereto is guided away from the roller 3 by the guide roller 23.

When the length of the strips of wrapping material is to be changed the device can be adapted to the changed length by simply changing the rotational speed of the roller 3, for example by means of a variable gear arrangement, so that the device operates at a speed suited to the operation of the wrapping machine.

It should be clearly understood that the embodiment described and illustrated is given by way of example and that many modifications, omissions and additions are possible without departing from the spirit of this invention.

I claim:

1. A device for attaching a tear strip to wrapping material, comprising a stationary cutter, a movable cutter arranged to cooperate with said stationary cutter for cutting a tear strip from a web of material, a rotatable roller arranged to receive a cut-off tear strip on its periphery, means for holding said cut-off tear strip on the periphery of said roller while rotating, and further means for feeding wrapping material to the periphery of said roller to place the tear strip against the wrapping material, wherein said stationary cutter and said movable cutters are arcuate, said cutters being of the same curvature as said roller.

2. A device as defined in claim 1, wherein said stationary cutter is adapted to act as a carrier for said web of material from which tear strips are successively cut off.

3. A device as defined in claim 1, wherein said holding means comprise means for creating a vacuum within a cavity of said roller and further means for creating a vacuum in said movable cutter, said cavity in said roller communicating with holes in a wall of said roller, said holes being arranged to successively register with further holes in said movable cutter, said further holes communicating with a further cavity in said movable cutter.

4. A device as defined in claim 1, and comprising means for heating the tear strips and the wrapping material when placed against each other.

References Cited

UNITED STATES PATENTS

| | | | |
|---|---|---|---|
| 3,146,152 | 8/1964 | Seragnoli | 156—519 |
| 3,226,282 | 12/1965 | Jackson | 156—519 |

DOUGLAS J. DRUMMOND, *Primary Examiner.*